UNITED STATES PATENT OFFICE.

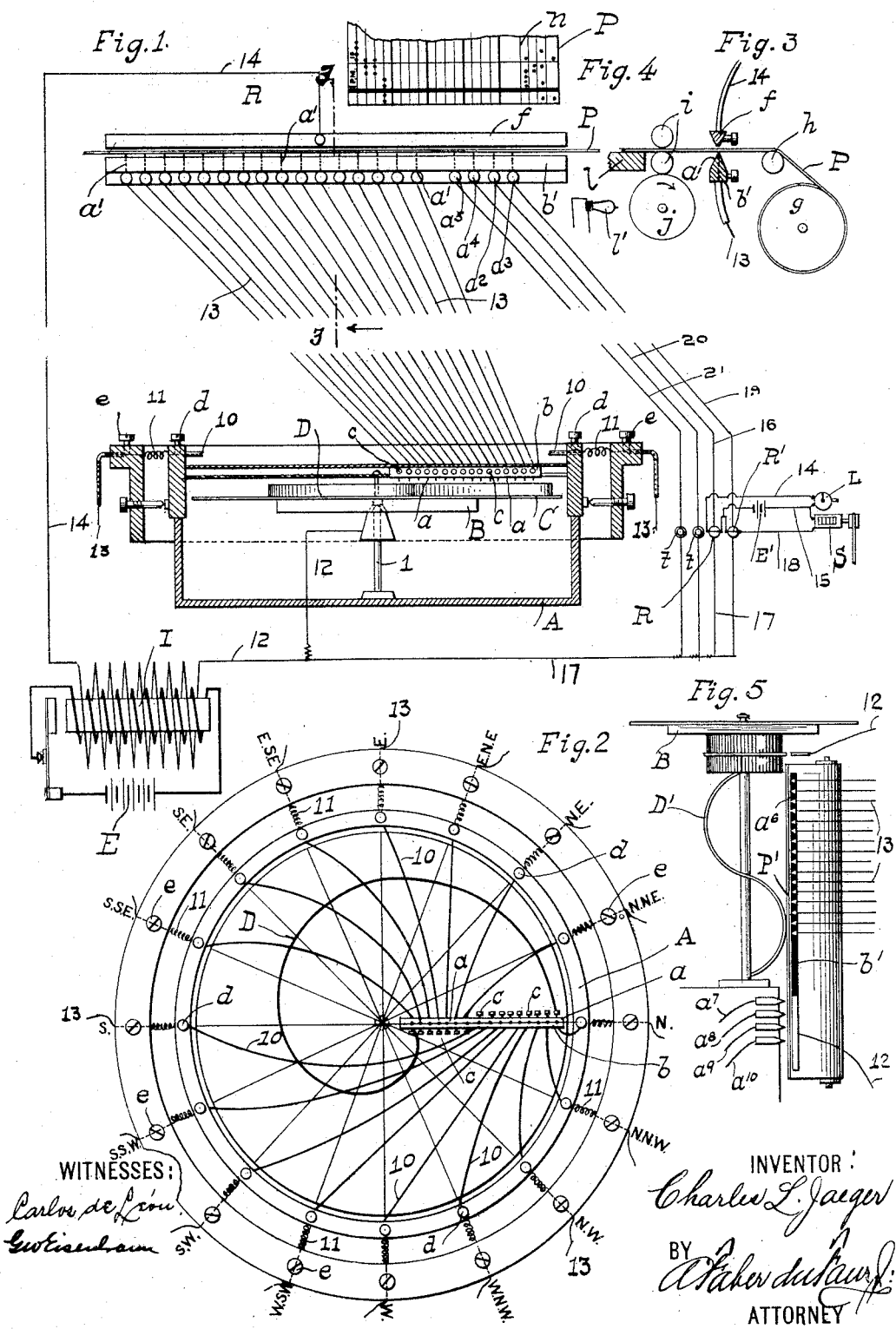

CHARLES L. JAEGER, OF NEW YORK, N. Y.

ELECTRIC RECORDING APPARATUS.

SPECIFICATION forming part of Letters Patent No. 620,326, dated February 28, 1899.

Application filed April 19, 1898. Serial No. 678,196. (No model.)

*To all whom it may concern:*

Be it known that I, CHARLES L. JAEGER, a citizen of the United States of America, residing at New York, in the borough of Manhattan, county of New York, and State of New York, have invented certain new and useful Improvements in Electric Recording Apparatus, of which the following is a specification.

My invention has reference to improvements in electric apparatus especially adapted for vessels for continuously recording on one or more pieces or strips of paper the direction sailed, the distance sailed, the speed and the variations in speed, the speed of the engines, the signals given, and the times of the several records.

My invention relates particularly to the compasses shown in my prior patents, No. 472,124, dated April 5, 1892, No. 533,902, dated February 12, 1895, and No. 556,987, dated March 24, 1896, and has for its object to provide means whereby the record may be made on a larger scale and duplicated, if desired. Heretofore the strip or chart has been placed directly in the compass or other recording device, and consequently the size of the strip or chart was limited by the diameter of the compass or other device. With the above object in view I construct the curved recording-conductor substantially as described in my prior patents; but instead of using a radial conductor I employ a series of contacts insulated from each other and arranged in a radial line adjacent to the recording-conductor, which contacts are connected by wires with an external series of contacts arranged adjacent to a linear conductor, between which two latter the strip or chart is moved. The dimensions of the external apparatus not being limited by the size of the compass or other device, can be made as large as desired, and so enable an open and clear record to be obtained.

The nature of my invention will best be understood when described in connection with the accompanying drawings, in which—

Figure 1 represents a sectional elevation of an apparatus constructed according to my invention, part being broken away. Fig. 2 is a diagrammatic plan of the compass and parts thereto appertaining. Fig. 3 is a section on the line 3 3, Fig. 1. Fig. 4 is a face view of a portion of the strip, drawn on a smaller scale than Fig. 1. Fig. 5 is an elevation showing my improvement applied to a compass with a helical recording-conductor.

Similar letters and numerals of reference designate corresponding parts throughout the several views of the drawings.

Referring at present to Figs. 1 and 2 of the drawings, the letter A designates the bowl of the compass, which may be of any usual construction. B is the magnetic needle, mounted on a pivot 1 in a usual manner and having attached thereto the usual compass-card C, upon which is mounted a spiral recording-conductor D of the construction described in my prior patent, No. 472,124, dated April 5, 1892, which said conductor participates in the movements of the needle and card. In place of a radial conductor coöperating with the spiral conductor for the purpose of forming perforations in a strip or chart fed between the two members I employ a series of contacts $a$, arranged in a radial line and insulated from each other. In practice I pass the several contacts $a$ through a frame or strip $b$, made of a non-conducting material, and clamp the same by the use of suitable binding-screws $c$, and I make use of one hundred and twenty-eight of these contacts, which are placed equidistant and correspond to one hundred and twenty-eight points on the compass—that is, as the spiral recording-conductor makes a complete revolution one hundred and twenty-eight series of sparks pass between the same and the several contacts, and if a chart or strip were passed between said spiral and the several contacts one hundred and twenty-eight perforations corresponding to one hundred and twenty-eight points of the compass would be formed. In the drawings I have shown only sixteen contacts, as I deem this number sufficient to illustrate the operation. The frame or strip may be placed between two plates of non-conducting material to retain the same in place, this construction being desirable with liquid-compasses. The card may be steadied by a pin passing through the inner plate. Each contact $a$ is connected by a wire 10 with a binding-post $d$ on the compass-bowl, and the several binding-posts $d$ are connected by wires 11 with binding-post $e$ on the insulated gimbal-ring G. The spiral conductor is connected by a wire 12 with the secondary coil of an induction-coil I, provided with a contact-breaker of a usual construction, the primary coil of said induction-coil being connected with the battery or other source of electricity E. The recording device R, which is placed externally to the compass and at any desired distance from the same, is provided in practice with one hundred and twenty-eight contacts $a'$, but here shown as having only sixteen, which said contacts are preferably insulated from each other in a suitable support $b'$ and arranged adjacent to a linear conductor $f$. Said contacts $a'$ are connected with the contacts $a$ of the compass by wires 13, and the linear conductor $f$ is connected by a wire 14 with the secondary coil of the induction-coil I. A strip of paper or other suitable material P is fed between the contacts $a'$ and the linear conductor $f$ by any suitable feed mechanism. In the example illustrated in Fig. 3 I have shown the strip supplied from a roll $g$ and passed over a guide-roll $h$ and fed forward by feed-rolls $i$, driven by a gear or friction-roll $j$, actuated by a clock-movement (not shown) of a usual construction. The strip may also be passed over a flat table or platen $l$, so that the record may be readily seen and memoranda written upon the same by the attendant. Of course any usual time feeding mechanism may be substituted for that described. The strip P is longitudinally divided by lines corresponding to the points on the compass and by transverse lines indicating the time.

The operation of the apparatus is as follows: As the ship's course changes the relative positions of the spiral conductor D and contacts $a$ change, and as successive contacts come adjacent to different portions of the spiral conductor a series of sparks pass between said spiral conductor and the corresponding contact, and simultaneously therewith a series of sparks passes between the corresponding contact $a'$ and the linear conductor $f$ at the recording device R and perforates the strip P at its corresponding longitudinal line. If a portion of the spiral conductor is between two contacts $a$, sparks will pass to both contacts and be transmitted through the contacts $a$ to the corresponding contacts $a'$ and the linear conductor $f$ and form two lines of perforations, as indicated at $m$, Fig. 4, thus showing on the strip that the course of the vessel was midway between two points of the compass at the time.

Various other records may be formed on the strip—such, for instance, those indicating the speed of the vessel, the signals given, and the speed of the engines. Means for producing such records I have shown in Fig. 1 in diagram, L being a log adapted to close a circuit 14 15 through a battery E', connected with a relay R, adapted to close the circuit of the induction-coil I through wires 16 and 17 to a contact $a^2$ whenever the log apparatus closes the circuit of battery E'. S is a revolution-counter adapted to close the circuit of the same battery through wire 18 and relay-circuit closer R', which latter momentarily closes the circuit of the induction-coil through wire 19, leading to contact $a^3$.

$t\,t$ are special circuit-closers placed in wires 20 and 21, leading to the contacts $a^4\,a^5$. The strip P is provided with longitudinal lines $n$, corresponding to the several contacts $a^2$ to $a^5$. The construction and connection of the several devices just described are more fully shown in my prior application, dated February 8, 1898, and serially numbered 669,546, for electric recording systems.

In Fig. 5 I have shown the construction for the compass described in my prior patent, No. 533,902, dated February 12, 1895, applied to closing the circuit through an internal and an external recording-strip. D' designates the helical conductor, turning with the magnetic needle B and adjacent to which is arranged the series of contacts $a^6$, preferably insulated from each other by the strip $b'$, as before. From these contacts are led the wires 13, connected with the contacts $a'$ at the recording device R, (shown in Fig. 1,) as before. In this construction I have also shown a strip P' placed between the contacts $a^6$ and the helical conductor D', so as to cause the production of a record within the compass simultaneously with that at the recording device R, said strip being fed by a usual time-movement, as shown in my said prior patent, No. 533,902. I also provide signal-contacts $a^7$, $a^8$, $a^9$, and $a^{10}$, as before described in connection with Fig. 1.

It is of course to be understood that the recording device may be arranged to feed a circular chart for producing the record and that the invention can be equally well applied for making records other than those of ships' movements—that is, it can be applied to galvanometers or other measuring instruments. In place of the induction-coil any other spark-producing device may be used.

The platen $l$ hereinbefore referred to is preferably made of glass or other transparent material, and below the same is placed a source of illumination—such, for instance, as one or more electric lamps $l'$, Fig. 3—so that the perforations can be plainly seen.

What I claim as new is—

1. In a recording system, the combination of a series of contacts and a conductor arranged to move relatively to each other but not placed in actual contact, a recording device comprising a second series of contacts corresponding to the first series of contacts and electrically connected with the same, a conductor arranged adjacent to said second series of contacts but not in actual contact with the same, a spark-producing device, electrical connections between said device and the conductors and contacts, and means for feeding a record-paper between the second series of contacts and the corresponding conductor; all constructed and arranged to form perforations in the record-paper, substantially as described.

2. In a recording system, the combination of a series of contacts and a conductor arranged to move relatively to each other but not placed in actual contact, a recording device comprising a second series of contacts corresponding to the first series of contacts and electrically connected with the same, a conductor arranged adjacent to said second series of contacts but not in actual contact with the same, a spark-producing device, electrical connections between said device and the conductors and contacts, and means for feeding record-papers between both series of contacts and their corresponding conductors; all constructed and arranged to form perforations in the record-papers, substantially as described.

3. In a recording system, the combination of a series of contacts and a conductor arranged to move relatively to each other but not placed in actual contact, a recording device comprising a second series of contacts corresponding to the first series of contacts and electrically connected with the same, a conductor arranged adjacent to said second series of contacts but not in actual contact with the same, a source of electricity, an induction-coil, electrical connections between said induction-coil, the conductors, the contacts and the source of electricity, and means for feeding a record-paper between the second series of contacts and the corresponding conductor; all constructed and arranged to form perforations in the record-paper, substantially as described.

In testimony whereof I have hereunto set my hand in the presence of two subscribing witnesses.

CHARLES L. JAEGER.

Witnesses:
E. P. HENDRICKSON,
CARLOS DE LÉON.